United States Patent [19]

Maxey

[11] Patent Number: 4,863,386

[45] Date of Patent: Sep. 5, 1989

[54] CHILD'S LEARNING CALENDAR

[76] Inventor: Mary A. Maxey, 5 Heritage Cove, Ruther Glen, Va. 22546

[21] Appl. No.: 241,456

[22] Filed: Sep. 8, 1988

[51] Int. Cl.$^4$ .............................................. G09B 19/00
[52] U.S. Cl. ..................................... 434/304; 434/238; 434/340
[58] Field of Search ........................ 434/304, 238, 340

[56] References Cited

U.S. PATENT DOCUMENTS 2,512,485  6/1950  Cougias ................................ 434/238
3,389,479  6/1968  Gross .................................... 434/340

Primary Examiner—William H. Grieb
Attorney, Agent, or Firm—Leon Gilden

[57] ABSTRACT

A child's learning calendar is set forth to enable a child's association of various shapes and recognize same and simultaneously gain understanding of the sequence and passage of days of the week. The calendar includes seven pairs of matched cards associating a day of the week with a predetermined configuration wherein the cards are each formed at respective engaging edges with extended elecrical contacts whereby positioning of the appropriate and predetermined matched pairs of cards within a pair of overlying compartments, the proper positioning of electrodes will complete an electrical circuit to illuminate a light bulb pair to indicate proper matching of the cards.

5 Claims, 1 Drawing Sheet

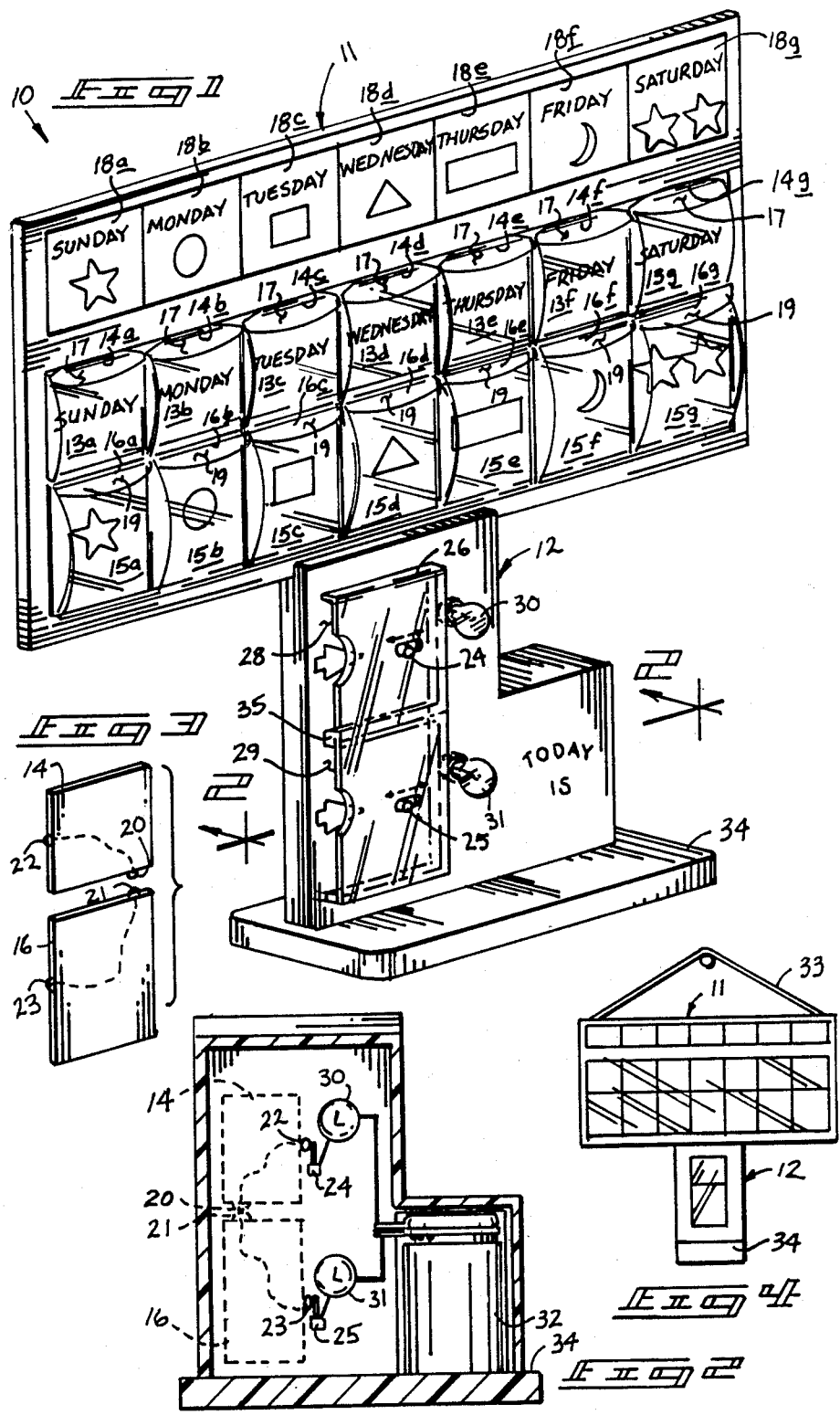

CHILD'S LEARNING CALENDAR

BACKGROUND OF THE INVENTION

1. Field of the Invention

The field of invention relates to learning devices, and more particularly pertains to a new and improved child's learning calendar to visually reinforce the learning of predetermined shapes and associated days of the week.

2. Description of the Prior Art

The use of various learning devices to teach young children is well known in the prior art. These devices have included a variety of various complex and interrelated structural arrangements to effect such teaching, as opposed to the instant invention's straight forward teaching of a learning device. For example, U.S. Pat. Des. No. 18,065 to Brackett sets forth the concept of a calendar associating configurations and days of the week, but is of an orientation that requires memorization, as opposed to the instant invention reinforcing proper association by manual manipulation of various structural elements for illumination of a light bulb.

U.S. Pat. Des. No. 259,001 to Mullaney sets forth a cabinet holder for paper rolls for enabling perpetual calendar containment therein.

U.S. Pat. Des. No. 267,497 to Gennetten sets forth a biorhythm calendar with interpretative illustrations of various illustrations and associated monthly time frame.

U.S. Pat. Des. No. 269,976 to Szigeti sets forth a calendar illustrating various configurations for association with days of the week but does not provide any means for manual manipulation for understanding of such configurational relationships.

U.S. Pat. Des. No. 274,535 to Word sets forth a calendar utilizing rearwardly attachable designations thereon for apparent continuous use of the calendar.

U.S. Pat. No. 2,314,387 to Carlsson sets forth a diet balancing apparatus to coordinate shapes with geometrical configurations whereby various pictorially illustrated foods are positioned on either side of a fulcrum to provide a "balanced diet".

U.S. Pat. No. 3,769,720 to Terrones sets forth an educational device wherein magnetically arranged configurational illustrations of various foods are positionable about a board to enable a child to match particular configurations to a predetermined space on the board.

As such, it may be appreciated that a new and improved child's learning calendar is set forth which addresses both the problems of ease of use and effectiveness and in this respect, the present invention substantially fulfills this need.

SUMMARY OF THE INVENTION

In view of the foregoing disadvantages inherent in the known types of learning calendars now present in the prior art, the present invention provides a child's learning calendar wherein the same may be conveniently positioned for utilization and thereafter readily manipulated by a child for indication of proper association of a week day and an associated geometric configuration. As such, the general purpose of the present invention, which will be described subsequently in greater detail, is to provide a new and improved child's learning calendar which has all the advantages of the prior art learn calendar devices and none of the disadvantages.

To attain this, the present invention utilizes seven pairs of associated cards wherein one of the pairs of cards is indicative of a day of the week and the other card of the pair utilizes an associated geometric configuration to assist a child in understanding an association of the days of the week and various aforenoted configurations. The cards, upon proper association, will complete an electrical circuit for visual indication of proper association by illumination of an associated bulb upon alignment of linear contacts prepositioned at different mating positions on each pair of said cards.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved child's learning calendar which has all the advantages of the prior art child's learning calendar and none of the disadvantages.

It is another object of the present invention to provide a new and improved child's learning calendar which may be easily and efficiently manufactured and marketed.

It is a further object of the present invention to provide a new and improved child's learning calendar which is of a durable and reliable construction.

An even further object of the present invention is to provide a new and improved child's learning calendar which is susceptible of a low cost of manufacture with regard to both materials and labor, and which accordingly is then susceptible of low prices of sale to the consuming public, thereby making such child's learning calendar economically available to the buying public.

Still yet another object of the present invention is to provide a new and improved child's learning calendar which provides in the apparatuses and methods of the prior art some of the advantages thereof, while simultaneously overcoming some of the disadvantages normally associated therewith.

Still another object of the present invention is to provide a new and improved child's learning calendar wherein associated cards are provided with electrical contacts upon confronting edges thereof for completion of electrical circuit and visual indication of proper association.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the instant invention.

FIG. 2 is an orthographic illustration of the present invention taken along the lines 2—2 of FIG. 1 in the direction indicated by the arrows.

FIG. 3 is a diagrammatic illustration of the rear faces of a matched pair of the cards set forth by the invention for completion of electrical circuit.

FIG. 4 is an orthographic view of the instant invention taken in elevation illustrating the suspension of the invention upon a vertical surface.

DESCRIPTION OF THE PREFERRED EMBODIMENT

With reference now to the drawings, and in particular to FIGS. 1 to 4 thereof, a new and improved child's learning calendar embodying the principles and concepts of the present invention and generally designated by the reference numeral 10 will be described.

More specifically, it will be noted that the child's learning calendar apparatus 10 essentially comprises an upper board 11 with an integrally associated lower "L" shaped board 12 secured medially to a lower edge of the upper board 11. The upper board 11 includes a plurality of upper compartments 13a, 13b, 13c, 13d, 13e, 13f, and 13g aligned with lower compartments 15a, 15b, 15c, 15d, 15e, 15f, and 15g. The upper and lower compartments are oriented and arranged for receiving respective upper date cards 14a through 14g to represent the days of the week and lower associated configuration cards 16a through 16g inclusively to associate a predetermined geometric configuration with each aforenoted day of the week. Each of the upper and lower compartments are formed with respective upper slots 17 and lower slots 19 for receiving the respective cards therein. The compartments, as illustrated, are overlying and aligned with one another to associate and equate a particular day of the week with a particular geometric configuration, such as the day "Sunday" with the underlying "Star". Overlying each respective pair of compartments is a respective teaching card 18a through 18g inclusively that associates the respective day and geometric configuration as a teaching and guidance aid to a child utilizing the instant invention.

Reference to FIG. 3 illustrates the reverse faces of each upper and lower card 14 and 16 respectively, wherein an upper card's lower edge includes an electrical contact 20 in alignment with a lower card's upper edge electrical contact 21. These contacts 20 and 21 are respectively in electrical association with respective side contacts 22 and 23 for each upper and lower card respectively wherein the contacts 21, 23, and 20, 22, are electrically connected for purposes to be described below. It should be noted that each electrical contact 20 and 21 positioned on opposed and confronting edges of the upper and lower cards respectively are positioned at different orientations along the cards, whereas the contacts 20 and 21 of the associated cards 14a and 16a are in different positions than the contacts 20 and 21 of cards 14b and 16b, etc., such that the only manner of completing an electrical circuit between an upper card and a lower card is to utilize only the paired cards comprising the pairs 14a, 16a; 14b, 16b; 14c, 16c; 14d, 16d; 14e, 16e; 14f, 16f; and 14g, 16g.

The lower board 12 includes an upper switch 24 and a lower switch 25 to be contacted by the side contacts 22 and 23 respectively which are positioned the same orientation on each upper and lower card respectively for each of the upper and lower cards. A first receiving chamber 26 is overlying a second receiving chamber 27 and are provided with a first side entrance 28 and a second side entrance 29 for respectively receiving the upper and lower cards 14 and 16. An upper light 30 and a lower light 31 will illuminate by completion of an electrical circuit powered by battery 32.

Upon insertion of an upper card 14 into the first receiving chamber 26, the upper card switch 24 will be contacted by an associated contact 22 with the lower card 26 contacting the lower switch 25 by the lower side switch 23. If a correct pair of cards of the aforenoted card pairs are utilized, then the respective switches 20 and 21 of upper and lower cards 14 and 16 will contact each other through the through extending slot 35 communicating between the first and second receiving chambers 27. In this manner, an electrical circuit will be completed starting at the battery 32 from one terminal and extending through the upper light 30, through the upper card 14, then through the lower card 16, then through the lower light 31, and completing a circuit to the other terminal of the battery 32 in a conventional completion of a DC circuit and thereby illuminate the upper and lower lights 30 and 31. Clearly should the upper and lower cards 14 and 16 respectively be mismatched, such as using a card 14a with card 16b, then electrical communication will not be completed due to the upper and lower edge electrical contacts 20 and 21 being offset and thereby not touching.

FIG. 4 illustrates the child's learning calendar 10 supported by a suspension cord 33 to a wall for convenience or alternatively, the base plate 34 is medially positioned to support the child's learning calendar upon a horizontal support surface.

Accordingly, the various date cards 14 and configurations cards 16 may be positioned in random orientation within the respective upper and lower compartments 13 and 15 whereupon the child may utilize the respective reaching cards 18 for guidance in proper selection of the appropriate pairs of cards to be positioned within the first and second receiving chambers 26 and 27.

As to the manner of usage and operation of the instant invention, the same should be apparent from the above description and accordingly, no further discussion relative to the manner of usage and operation of the instant invention shall be set forth.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An educational calendar apparatus comprising in combination, an upper board integrally secured to an underlying lower board, the upper board including a row of upper compartments of a predetermined number and underlying adjacent row of lower compartments of a like predetermined number, and a date card positionable in each upper compartment, and a configuration card positioned on each of said lower compartments, said date cards and said configuration cards each equaling said predetermined number, and said lower board including an electrical circuit and an upper and lower chamber associated with said electrical circuit for accepting a complementary date and configuration card, and wherein each date card includes an underlying edge positioned electrical contact, and each configuration card includes an upper edge positioned electrical contact wherein said complementary date and configuration cards are determined by said electrical contacts being aligned with one another when said date card and said configuration card are positioned within said upper and lower chambers of said lower board, and each date card and configuration card includes a side electrical contact positioned on a side thereof wherein each of said side positioned electrical contacts is positioned for engaging a respective upper and lower electrical contact switch within respective upper and lower chambers and a light bulb associated with each upper and lower chamber in electrical communication with a battery whereupon positioning of a complimentary date and configuration card within said upper and lower chamber, said electrical circuit will be completed for illumination of said light bulbs.

2. An educational calendar apparatus as set forth in claim 1 wherein a row of teaching cards are positioned overlying said upper and lower compartments wherein said teaching cards are integrally secured to said upper board for indication of said complimentary date and configuration cards.

3. An educational calendar apparatus as set forth in claim 4 wherein said predetermined number equals seven.

4. An educational calendar apparatus as set forth in claim 3 wherein each upper and lower compartment includes a slot for selectively positioning a date and configuration card selectively within each compartment.

5. An education calendar apparatus as set forth in claim 6 wherein a suspension cord is secured to said upper board for positioning of said apparatus onto a vertical surface and a base plate integrally secured to a lowermost portion of said lower board is provided for positioning of said apparatus upon a horizontal support surface.

* * * * *